United States Patent [19]
Immega et al.

[11] Patent Number: 6,002,815
[45] Date of Patent: Dec. 14, 1999

[54] LINEAR SENSOR IMAGING METHOD AND APPARATUS

[75] Inventors: Guy Broer Immega; Geoffrey Edward Vanderkooy, both of Vancouver, Canada

[73] Assignee: Kinetic Sciences, Inc., Vancouver, Canada

[21] Appl. No.: 08/892,577

[22] Filed: Jul. 16, 1997

[51] Int. Cl.[6] .............................. G06K 7/00; G06K 9/00; G01J 1/42; H04N 1/04

[52] U.S. Cl. .......................... 382/312; 382/315; 382/318; 235/439; 235/440; 250/208.3; 358/494

[58] Field of Search ...................................... 382/124, 126, 382/312, 315, 318; 358/486, 487, 494; 235/439, 440; 250/208.1, 208.3

[56] References Cited

U.S. PATENT DOCUMENTS

| | | | |
|---|---|---|---|
| 4,833,724 | 5/1989 | Goel | 382/318 |
| 5,613,014 | 3/1997 | Eshera et al. | 382/124 |
| 5,633,947 | 5/1997 | Sibbald | 382/124 |
| 5,828,773 | 10/1998 | Setlak et al. | 382/126 |

*Primary Examiner*—Phuoc Tran
*Assistant Examiner*—Daniel G. Mariam
*Attorney, Agent, or Firm*—Oyen Wiggs Green & Mutala

[57] ABSTRACT

A first linear sensor array produces, at a first time of occurrence, a first image of a segment of an object as the object moves across the sensor at a variable speed. The image and its time of occurrence are accumulated in a buffer. As the object continues to move across the sensor, a successive plurality of the segment images seen by the first sensor are accumulated in the buffer, together with their respective times of occurrence. A second linear sensor array spaced a distance d from the first array produces, at a second time of occurrence, a second image of another segment of the moving object. The second image is compared with the accumulated first images to determine which of the accumulated first images is most similar to the second image. The object's speed S can then be estimated as an appropriately weighted function of $d/(t_j-t_m)$ [i.e. $S\ d/(t_j-t_m)$], where $t_j$ is the time of occurrence of a selected one of the second images and $t_m$ is the time of occurrence of the first image most similar to the selected second image. By continually monitoring the object's speed in this fashion, one may select and transfer into an image buffer those image segments which together form the highest quality image of the object, independently of the object's speed of motion past the sensor and without the need for expensive, bulky stepper motors, mechanical motion encoders, or the like.

5 Claims, 14 Drawing Sheets

LINEAR SENSOR IMAGING METHOD AND APPARATUS

TECHNICAL FIELD

This application pertains to a method and apparatus for inexpensively capturing an image of an object which moves, at an unknown variable or constant speed, past one or more linear sensor arrays.

BACKGROUND

Imaging devices such as fax machines capture images by scanning the image at a known, constant rate. For example, in a typical fax machine, a stepper motor draws the sheet bearing the image through a slot to move the image past a fixed scanning head at a constant rate. At any particular time, the scanning head "sees" only a narrow, linear portion of the image adjacent the scanning head. Because the scan rate is constant and predetermined, the fax machine's control circuity can easily be activated at fixed, sequential time intervals, to transfer the image portion seen during each interval into a buffer. The buffer accumulates the image portions to yield a full digital representation of the scanned image. Instead of moving the image past a fixed scanning head as described above, the image may remain in a fixed position while the stepper motor moves the scanning head past the image at a constant rate, as in a typical flat bed scanner.

Prior art devices like those mentioned above use relatively expensive, bulky stepper motors to maintain the scan rate constant to a high degree of precision. Some prior art devices, such as hand-held scanners, use less bulky encoders coupled to rollers to synchronize the scanning process as the scanner is hand-manoeuvred, at variable speed, over the object being imaged. Although the scan rate varies, it can be determined by electrical and/or mechanical coupling between the roller(s) and encoder(s). However, such arrangements require expensive high precision encoders and/or considerable mechanical complexity to achieve high resolution in the scanned image.

The present invention provides a method and apparatus for capturing an image of a moving object using one or more linear arrays, without the need for high precision stepper motors, and without the need for mechanically measuring the speed of the object.

SUMMARY OF INVENTION

In one embodiment, the invention provides an imaging apparatus in which a linear sensor array sequentially produces images of segments of an object as the object moves transversely across the array to successively position the segments adjacent the sensor. Sequentially ordered pairs of the segment images are compared to produce an output signal representative of similarity therebetween. One of the pair of segment images is accumulated in a buffer whenever the comparator output signal is not representative of substantial similarity between the pair of images.

In another embodiment, the invention provides an imaging apparatus in which a first linear sensor array produces, at a first time of occurrence, a first image of a first segment of an object positioned adjacent the first sensor. A second linear sensor array is spaced from the first array by a distance d. At a second time of occurrence, the second array produces a second image of a second segment of the object positioned adjacent the second sensor. A buffer is coupled to the first array. The first image and its time of occurrence are accumulated in the buffer for a successive plurality of the first segments as the object moves across the first array. A comparator is coupled between the buffer and the second array. The comparator compares the second image with each one of a selected plurality of the accumulated first images to determine which one of the accumulated first images is most similar to (i.e. best matches) the second image. An object speed estimator then estimates the object's speed S as an appropriately weighted function of $d/(t_i-t_m)$ [i.e. $S \, d/(t_i-t_m)$], where $t_i$ is the time of occurrence of a selected one of the second images, and $t_m$ is the time of occurrence of the first image most similar to the selected second image.

The imaging apparatus may be operated at either a fixed or a variable sampling rate. If the sampling rate is fixed, the segment images are produced during sampling intervals of the same duration. Since the speed and time duration of each of the "best match" scans is known, the width of each such scan is readily determinable and the buffer can be sampled to extract equal width image "strips" therefrom which can be assembled to yield the full image. If a variable sampling rate is used, each segment image is produced during a sampling interval having a duration equal to $1/(R*S)$ where R is the desired (fixed) resolution of the final image. Because the scan rate changes in direct proportion to the object's speed, the composite image can be read directly from buffer as soon as the scanning process is complete.

Further embodiments of the invention incorporate additional sensor arrays to more accurately and robustly measure the object's speed and consequently improve the resolution of the final image.

DESCRIPTION

Figure 1:
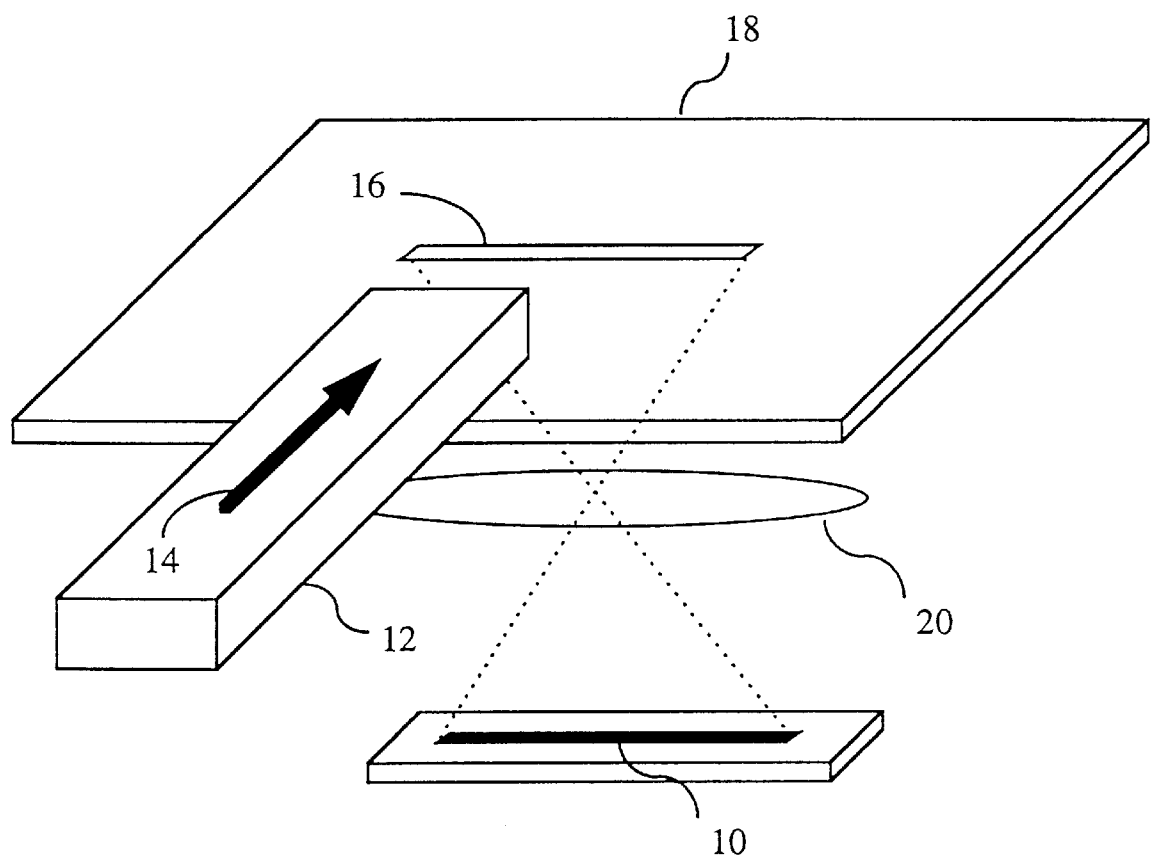
FIG. 1 is a schematic, oblique perspective illustration of an imaging apparatus having a single linear sensor array.
Figure 2:
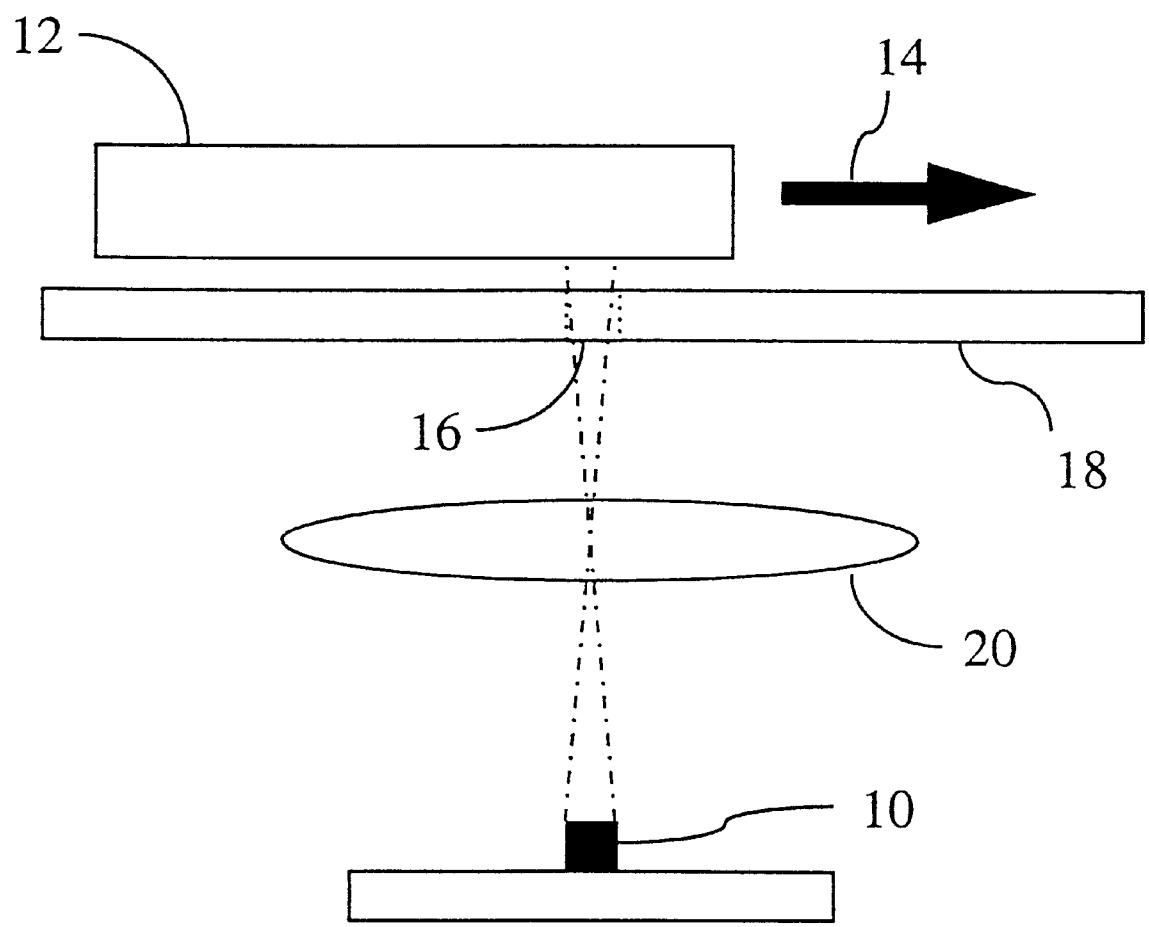
FIG. 2 is a side elevation view of the FIG. 1 apparatus.

FIGS. 1 and 2 depict a first embodiment of the invention incorporating a single linear sensor array 10. The object 12 which is to be imaged moves, at an unknown variable or constant speed, in the direction of arrow 14 over viewing region 16 in cover plate 18. Sensor 10 "sees" a narrow linear segment of object 12 through viewing region 16 and produces an output signal representative of that segment. Lens 20, or other optical means, assists in focusing the object segment seen by sensor 10.

Sensor 10 may be a 1×n pixel linear array. Cover plate 18 may be transparent, in which case viewing region 16 may be a predefined area of cover plate 18. Alternatively, viewing region 16 may be a slit or aperture in cover plate 18.

Figure 3:
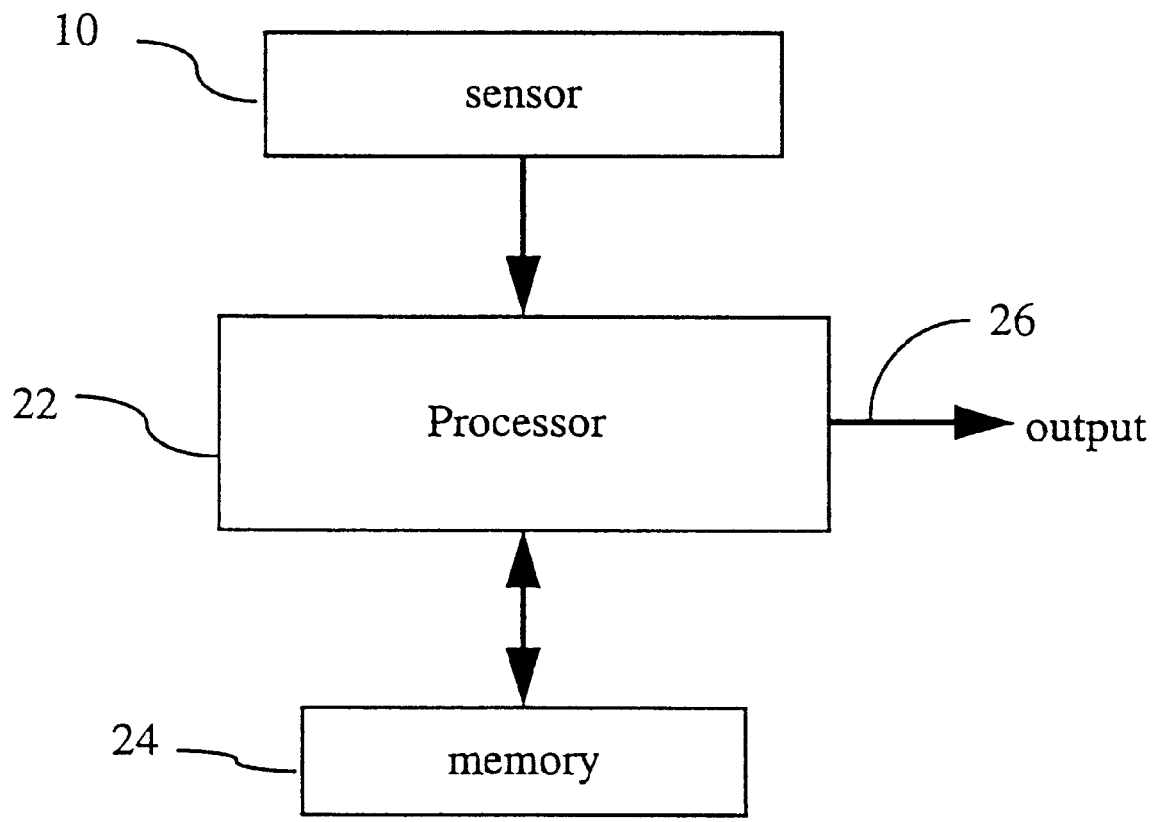
FIG. 3 is a schematic block diagram representation of the electronic components of the FIG. 1 apparatus.

As schematically depicted in FIG. 3, the output signal produced by sensor 10 is transmitted to a processor 22 which stores the output signal in memory buffer 24. When a complete (or partial) image of object 12 has been accumulated in buffer 24 as described below, processor 22 outputs the complete (or partial) image at 26.

Figure 4:
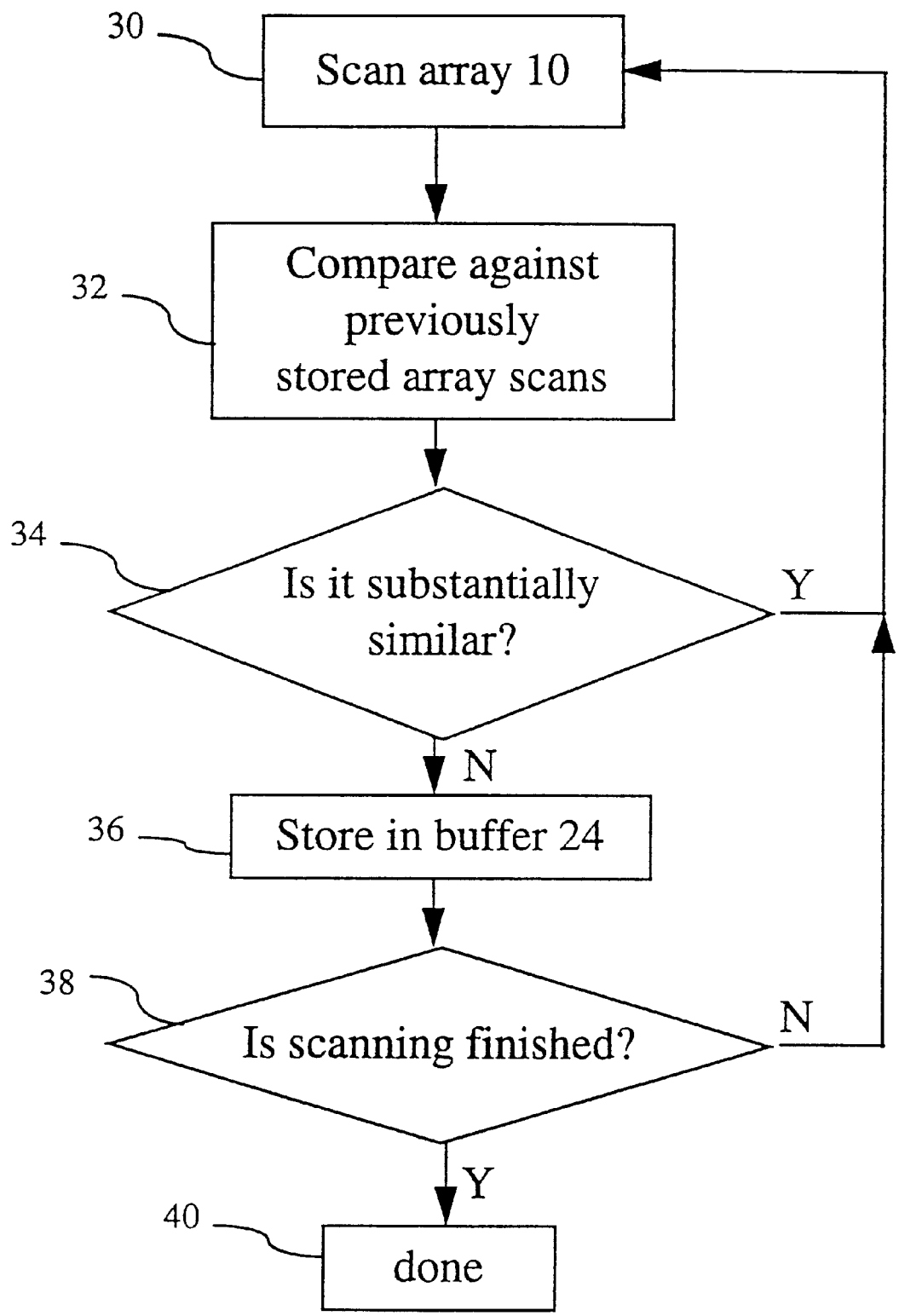
FIG. 4 is a flowchart illustrating the sequence of steps by which the FIG. 1 apparatus forms an image of a moving object.

Operation of the apparatus depicted in FIGS. 1–3 is illustrated by the FIG. 4 flowchart. The signal currently being produced by sensor 10 is received by processor 22 as indicated at step 30 (i.e. sensor 10 is scanned to obtain a 1×n pixel image of the segment of object 12 currently adjacent viewing region 16). The signal currently produced by sensor 10 (which typically consists of a series of n bytes, with each byte corresponding to one pixel in sensor 10) is compared by processor 22 with the previously scanned signal stored in buffer 24, as indicated at step 32. If comparison step 32 reveals, at step 34, that the signal currently produced by sensor 10 is substantially similar to the previously scanned signal stored in buffer 24, then the aforementioned steps are repeated, commencing with step 30. Otherwise, if comparison step 32 reveals substantial dissimilarity between the signal currently produced by sensor 10 and the previously scanned signal, then the signal currently produced by sensor 10 is stored in buffer 24 as indicated at step 36. If storage step 36 does not fill buffer 24 (i.e. the result of test step 38 is negative) then the aforementioned steps are repeated, commencing with step 30. Otherwise, if storage step 36 fills buffer 24 operation terminates at step 40, leaving the full image in buffer 24.

Those skilled in the art will appreciate that buffer 24 is initially cleared prior to commencement of the image scanning operation. This corresponds to storage, in buffer 24, of a series of blank "previously scanned" image signals. It will also be understood that determination, by step 34, of "substantial similarity" between the current and previously scanned signals depends upon the test used to compare the signals, which may be varied to suit the nature of the data comprising such signals. Further, it is not essential to compare the signal currently produced by sensor 10 with the immediately previously scanned signal; previously scanned signals could be stored in a buffer and the comparison made with a selected one of the stored signals.

Persons skilled in the art will also recognize that a variety of techniques can be used to indicate commencement of the image scanning process; or, to indicate termination of the process. For example, an externally provided trigger signal, or initial detection of an output signal from sensor 10, or repetitive checking of sensor 10 for an output signal different from a predefined "scanning non-started" signal, are different conditions which could be detected to indicate commencement of the scanning process with step 30. To indicate termination of the process (i.e. to perform test step 38) one could check to see if the last performance of step 36 had filled buffer 24 to capacity, or determine that a predefined time interval had elapsed with no detection of "substantially dissimilar" data during step 34, or provide an external trigger signal to indicate complete passage of object 12 beyond viewing region 16, etc.

Figure 5:
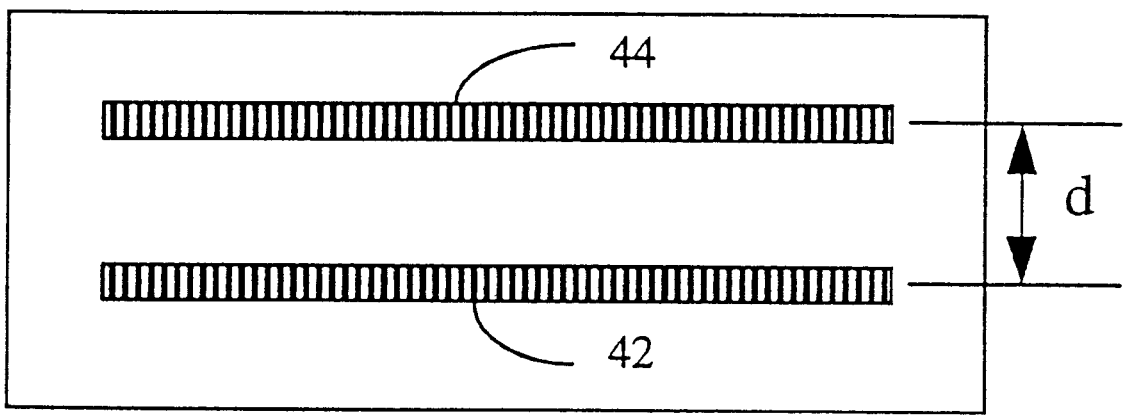
FIG. 5 is a top plan view of a pair of spaced linear sensor arrays.

FIG. 5 depicts an alternative sensor having first and second parallel linear arrays 42, 44 which are spaced apart by a distance "d". Arrays 42, 44 may each be 1×n pixel linear arrays. The FIG. 6 imaging apparatus incorporating arrays 42, 44 is similar to that described above except that two spaced, parallel viewing regions 46, 48 are provided in cover plate 18. Array 44 "sees" a different segment of object 12 than the segment seen by array 42. More particularly, since array 44 is spaced a distance "d" behind array 42, array 42 sees a segment of object 12 which is spaced a distance "d" ahead of the segment seen by array 44. As shown in FIG. 7, array 42 is used to derive the segments which are stored in buffer 24, while array 44 is used to determine which of the previously scanned segments stored in buffer 24 is most similar to the object segment currently seen by array 44.

Figure 6:
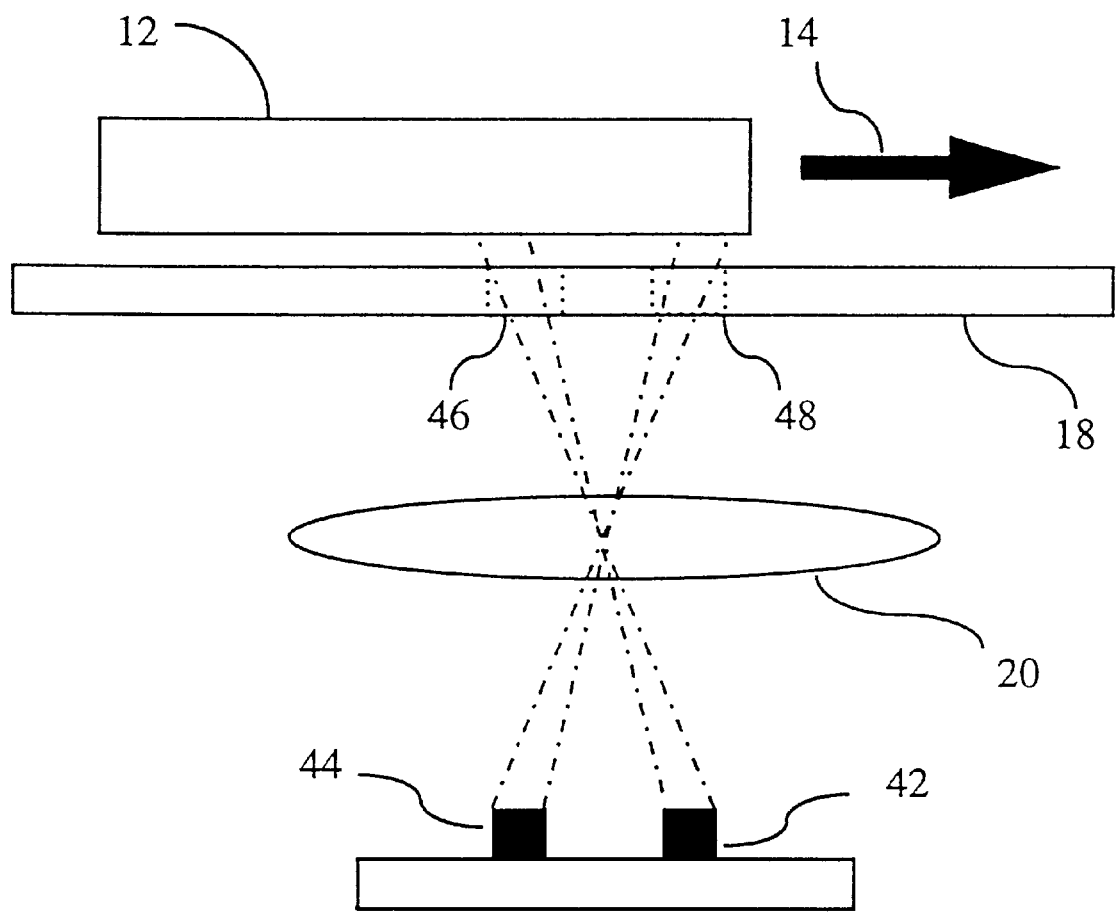
FIG. 6 is a side elevation view of an imaging apparatus incorporating the FIG. 5 linear sensor arrays.
Figure 7:
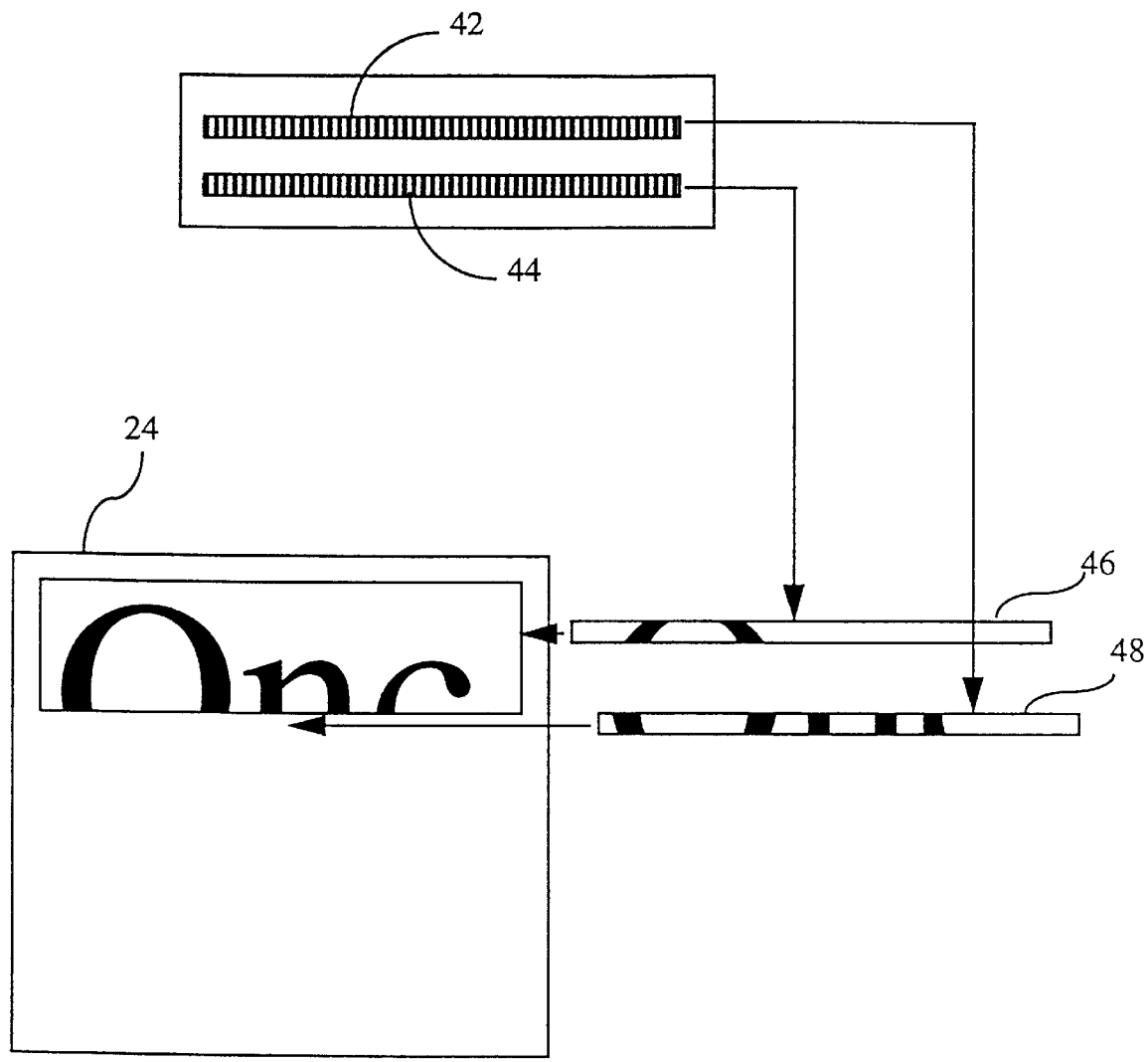
FIG. 7 is a stylized representation depicting accumulation in a storage buffer of a composite image formed of selected image segments obtained via the FIG. 5 linear sensor arrays.

For purposes of simplification, FIG. 6 shows viewing regions 46, 48 spaced apart by the same distance "d" as arrays 42, 44. However, it is not essential for the viewing regions and arrays to have the same separation distance. The relationship between the viewing regions and arrays is determined by lens 20, or other optical means. Well known techniques can easily be applied to determine the location and size of the viewing region "seen" by each array. This applies to any embodiment of the invention employing two or more spaced sensor arrays.

Figure 8:
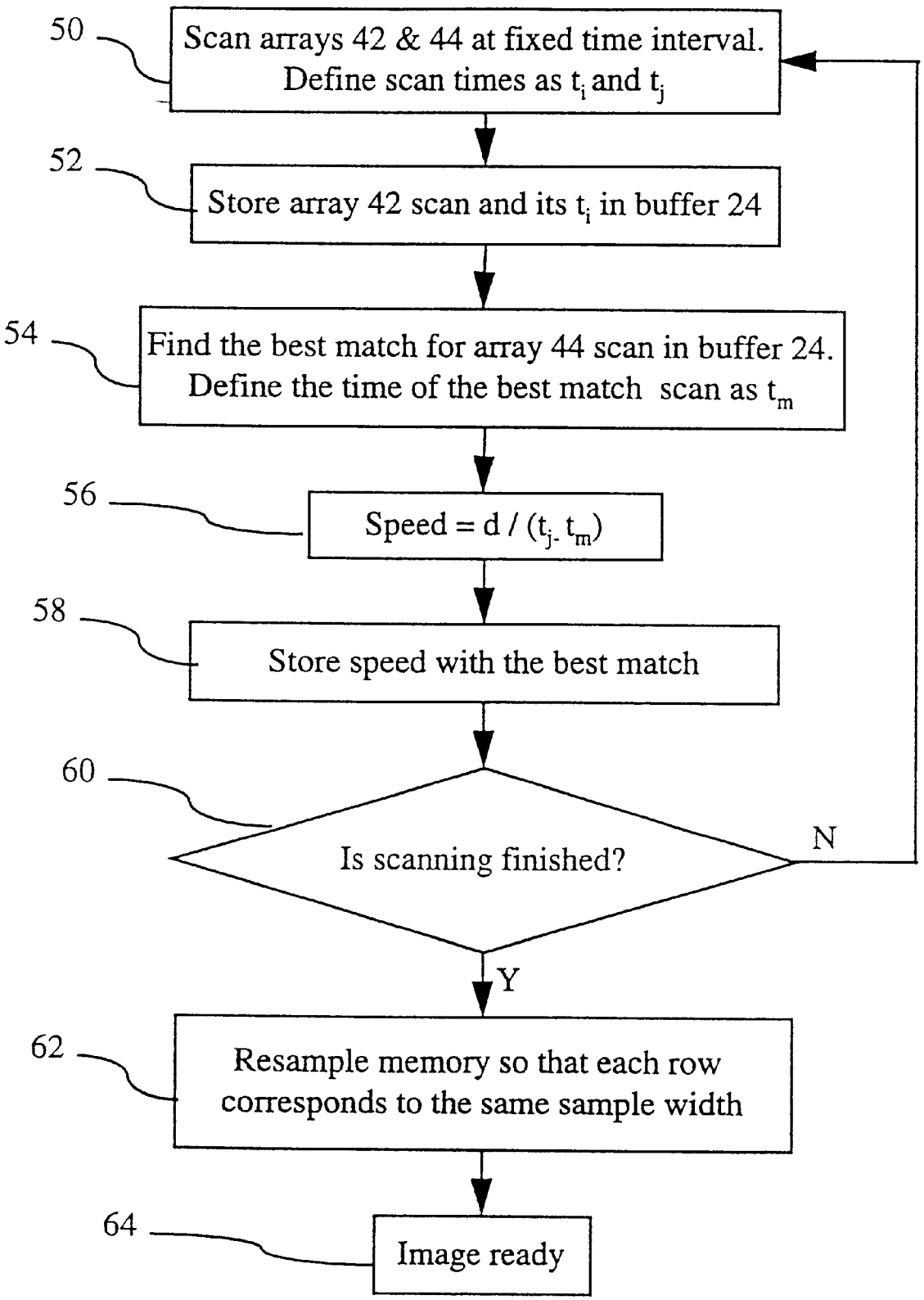
FIG. 8 is a flowchart illustrating the sequence of steps by which the FIG. 6 apparatus forms an image of a moving object.

The FIG. 8 flowchart depicts a method of operating the imaging apparatus depicted in FIGS. 6–7, using a fixed sampling rate. The signals produced by each of sensors 42, 44 at fixed time sampling intervals having times of occurrence $t_1, t_2, \ldots t_n$ are received as indicated at step 50 (i.e. sensors 42, 44 are scanned to obtain two 1×n pixel images of the two segments of object 12 which are respectively currently adjacent viewing regions 46, 48). For each time interval, the scanned image signal produced by array 42 is stored in buffer 24, together with a signal representative of that signal's time of occurrence, as indicated at step 52. At step 54, a selected plurality of the previously scanned signals stored in buffer 24 are compared with the scanned image signal produced by array 44 to find the stored signal which best matches (i.e. which is most similar to) the scanned image signal produced by array 44. The speed S of object 12 is then determined, at step 56, as $d/(t_j - t_m)$, where $t_j$ is the time of occurrence of a selected one of the scanned image signals produced by array 44, and $t_m$ is the time of occurrence of the stored signal which best matches the selected array 44 signal. (Note that $t_j = t_i$ if sensor arrays 42, 44 are scanned simultaneously.) At step 58, the speed information is stored in buffer 24 by appending the speed information to or otherwise associating it with the stored signal which best matches the scanned image signal produced by array 44. As indicated by test step 60, the aforementioned steps are repeated, commencing with step 50, until the scanning process is finished. Because arrays 42, 44 are spaced as aforesaid, steps 50, 52 are typically repeated a plurality of times for different segments as object 12 moves over viewing region 46 before reaching viewing region 48.

Once the scanning process is finished, the composite image is formed, at steps 62–64, by sequentially extracting image "strips" of equal width from the scanned image signals stored in buffer 24. Since the speed S and time duration of each of the "best match" scans is known, the width $w_i$ of each such scan is easily determined as $w_i=S*t_i$ and accordingly buffer 24 can easily be sampled to extract equal width image strips therefrom.

Figure 9:
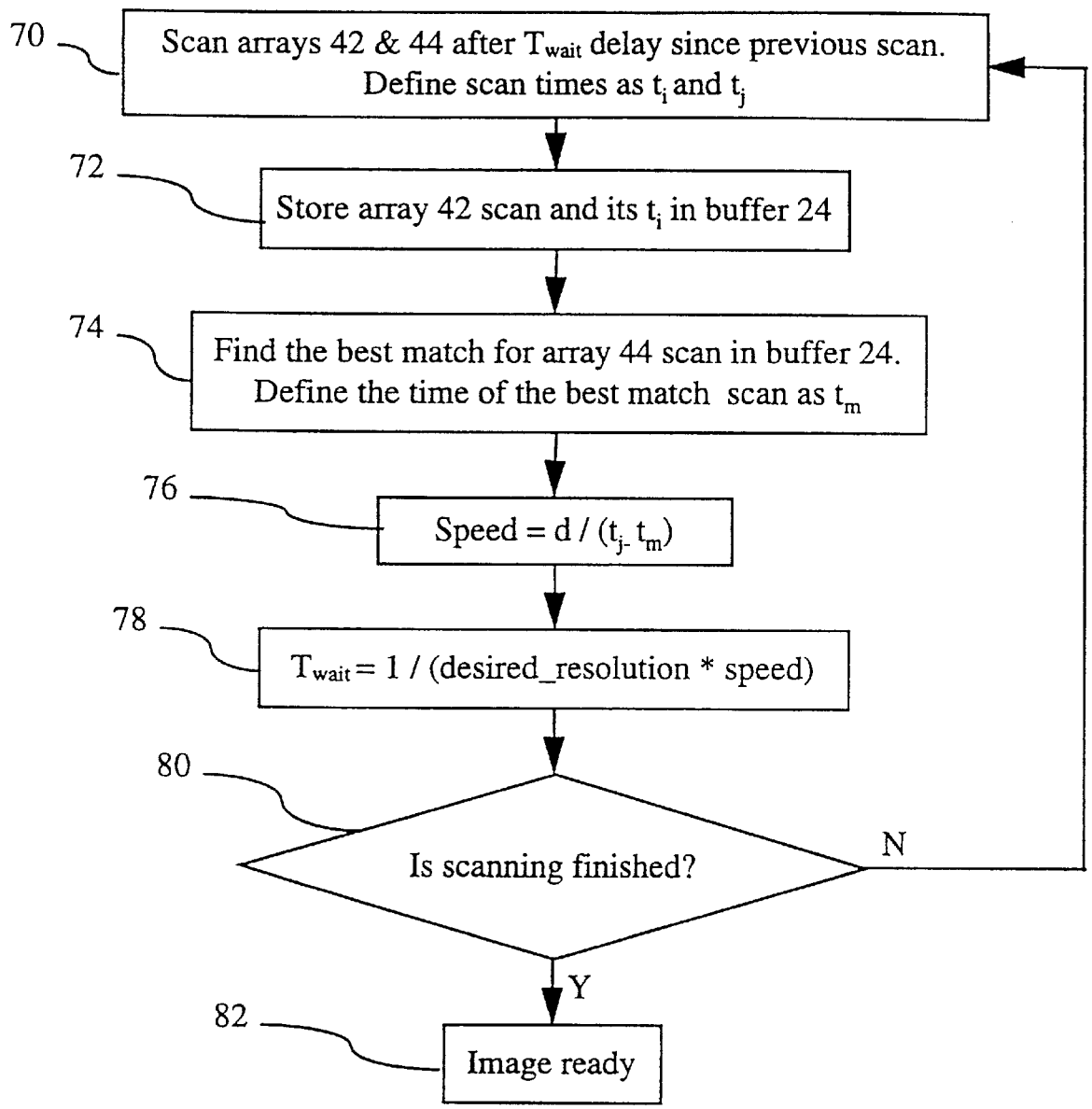
FIG. 9 is a flowchart illustrating an alternative sequence of steps by which the FIG. 6 apparatus forms an image of a moving object.

The FIG. 9 flowchart depicts an alternative method of operating the FIGS. 6–7 imaging apparatus, using real-time scan rate control. Steps 70, 72, 74 and 76 are identical to FIG. 8 steps 50, 52, 54 and 56 respectively, except that whereas the FIG. 8 method used a fixed sampling rate, the FIG. 9 method uses a variable sampling rate which is determined by the (variable) speed S of object 12 and the desired (fixed) resolution R of the final image. Thus, in the FIG. 9 method, each sampling interval $t_1, t_2, \ldots t_n$ has a variable duration $T_{wait}=1/(R*S)$ which is determined at step 78, after determination of the current speed S of object 12 at step 76. Because the FIG. 9 method normalizes the scan rate as a function of speed, the composite image can be read directly from buffer 24 at step 82 as soon as the scanning process is complete, whereas the FIG. 8 method requires normalization of the width of each image strip, as previously explained. It can thus be seen that the FIG. 9 method produces the final image more quickly than the FIG. 8 method. However, the FIG. 9 method is more complex than the FIG. 8 method. For example, a faster, more expensive version of processor 22 may be required to reliably implement the FIG. 9 method.

Figure 10:
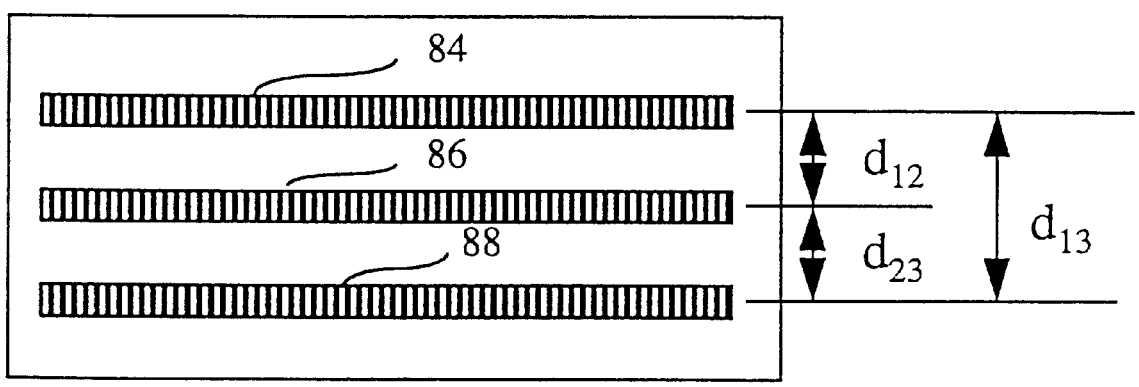
FIG. 10 is a top plan view of three spaced linear sensor arrays.

By increasing the number of sensor arrays one may more accurately and robustly measure the speed of object 12 and consequently improve the reconstruction of the final image. For example, FIG. 10 depicts a sensor having first, second and third parallel linear arrays 84, 86, 88. First and second arrays 84, 86 are spaced apart by a distance $d_{12}$; second and third arrays 86, 88 are spaced apart by a distance $d_{23}$; and, first and third arrays 84, 88 are spaced apart by a distance $d_{13}=d_{12}+d_{23}$. Arrays 84, 86 and 88 may each be 1×n pixel linear arrays, and they may be employed in an imaging apparatus like that depicted in FIG. 6 except that a third viewing region is required in cover plate 18 for the third sensor array. Arrays 84, 86 and 88 each "see" different segments of object 12. More particularly, array 86 sees a segment of object 12 which is spaced a distance $d_{12}$ ahead of the segment seen by array 84; and, array 88 sees a segment of object 12 which is spaced a distance $d_{23}$ ahead of the segment seen by array 86 and which is also spaced a distance $d_{13}$ ahead of the segment seen by array 84.

Figure 11:
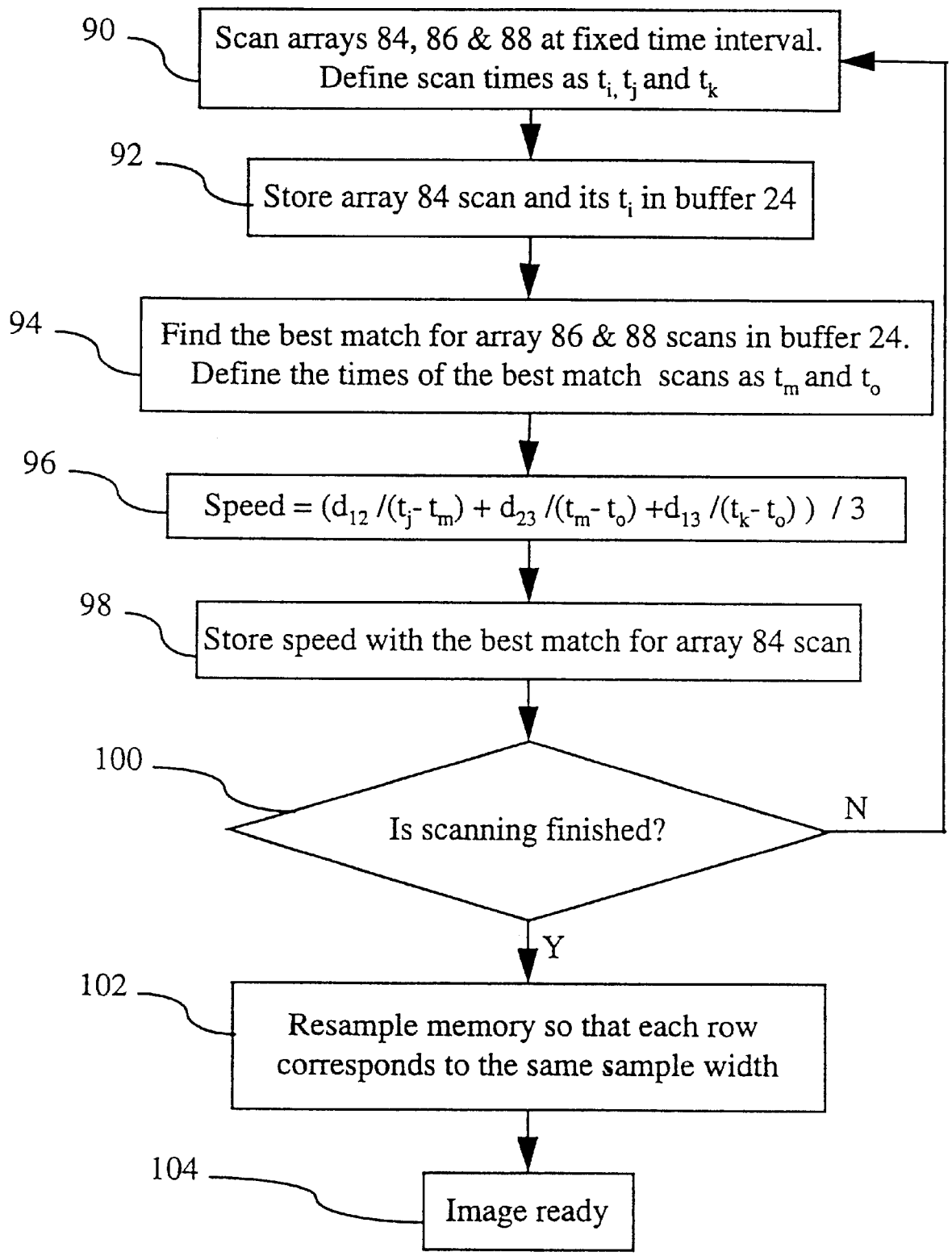
FIG. 11 is a flowchart illustrating the sequence of steps by which imaging apparatus incorporating the FIG. 10 linear sensor arrays forms an image of a moving object.

The FIG. 11 flowchart depicts a method of operating an imaging apparatus incorporating the FIG. 10 triple linear array sensor, using a fixed sampling rate. The FIG. 11 method is identical to the FIG. 8 method, except that whereas the FIG. 8 method is adapted to operation of the FIG. 5 dual linear array sensor, the FIG. 11 method is adapted to operation of the FIG. 10 triple linear array sensor. Thus, at step 90, the signals produced by each of sensors 84, 86, 88 at fixed time sampling intervals having times of occurrence $t_1, t_2, \ldots t_n$ are received as three 1×n pixel images of the three segments of object 12 seen by the three sensors at the respective sample times. For each time interval, the scanned image signal produced by the first array 84 is stored in buffer 24, together with a signal representative of that signal's time of occurrence, as indicated at step 92. At step 94, the previously scanned signals stored in buffer 24 are compared with the scanned image signals produced by both second array 86 and third array 88 to find the stored signal most similar to (i.e. which best matches) the scanned image signal produced by first array 84. The speed S of object 12 is then determined, at step 96, as an appropriately weighted function of $d_{12}/(t_j-t_m)$, $d_{23}/(t_m-t_o)$, and $d_{13}/(t_k-t_o)$ [i.e. S $d_{12}/(t_j-t_m)$, $d_{23}/(t_m-t_o)$, and $d_{13}/(t_k-t_o)$];

where $t_j$ is the time of occurrence of a selected one of the scanned image signals produced by array 86, $t_k$ is the time of occurrence of a selected one of the scanned image signals produced by array 88, $t_m$ is the time of occurrence of the previously stored array 84 signal which best matches the selected array 86 image signal, and $t_o$ is the time of occurrence of the previously stored array 84 signal which best matches the selected array 88 signal. At step 98, the speed information is stored in buffer 24 by appending the speed information to or otherwise associating it with the stored signal which best matches the scanned image signal produced by array 84. As indicated by test step 100, the aforementioned steps are repeated, commencing with step 90, until the scanning process is finished. Once the scanning process is finished, the composite image is formed, at steps 102–104, by sequentially extracting image "strips" of equal width from the scanned image signals stored in buffer 24, as discussed above in relation to step 62 of FIG. 8.

Figure 12:
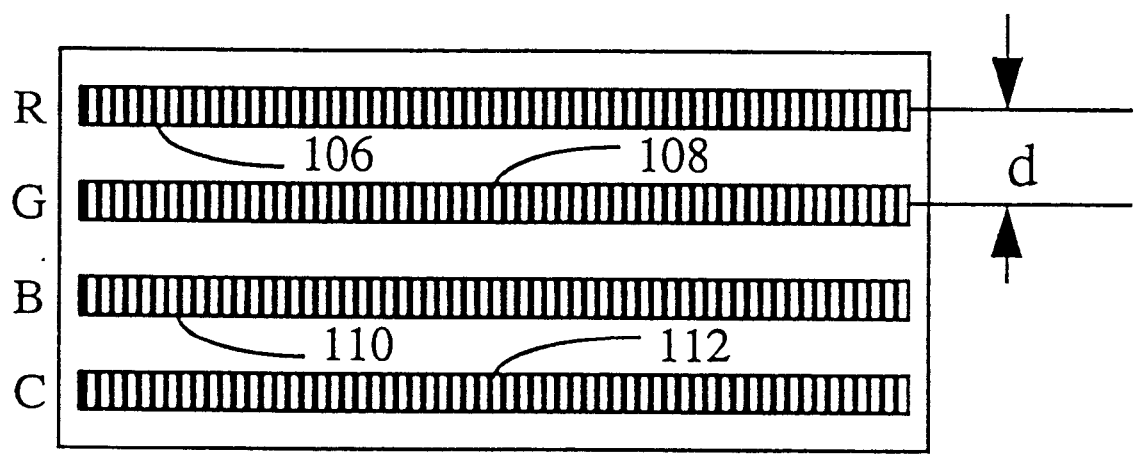
FIG. 12 is a top plan view of four spaced, colour filtered linear sensor arrays.

The invention also facilitates capture of colour images. For example, FIG. 12 depicts a sensor having four parallel linear arrays 106, 108, 110 and 112. Array 106 is covered by a red band-pass filter and accordingly "sees" only the red portion of the colour spectrum. Similarly, arrays 108, 110 are covered by green and blue band-pass filters respectively and thus "see" only green and blue portions of the colour spectrum respectively. Array 112 has no filter (or may have a transparent cover) and accordingly "sees" the full colour spectrum. Arrays 106, 108 are spaced apart by a distance "d". Arrays 108, 110 and 110, 112 may be similarly spaced, although as noted above it is not essential that the array spacing be equal in any embodiment of the invention.

Figure 13:
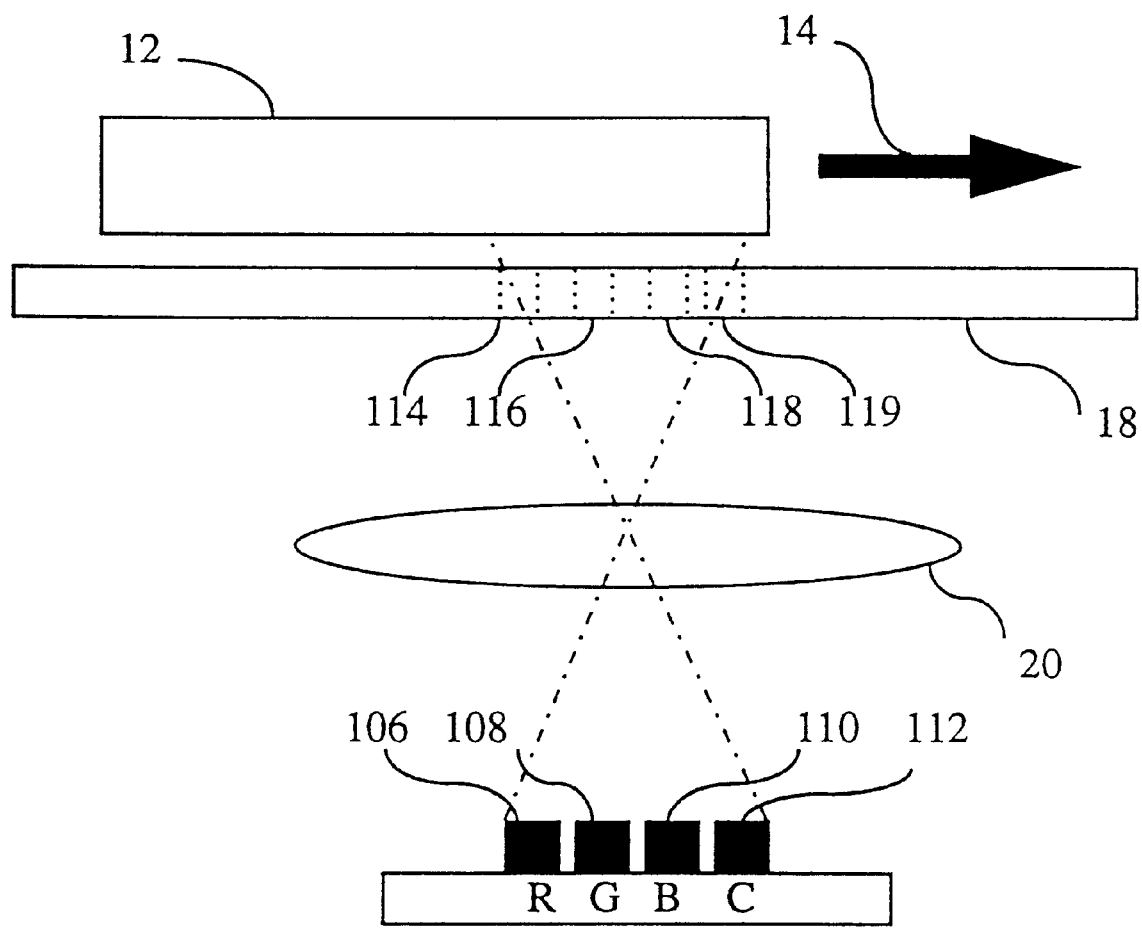
FIG. 13 is a side elevation view of an imaging apparatus incorporating the FIG. 12 linear sensor arrays.

The FIG. 13 imaging apparatus incorporating arrays 106, 108, 110, 112 is similar to that described above in relation to FIG. 6 except that four spaced, parallel viewing regions 114, 116, 118, 119 are provided in cover plate 18. For ease of reference, sensor arrays 106, 108, 110, 112 are hereafter respectively designated "R" (red), "G" (green), "B" (blue) and "C" (clear), as indicated in FIGS. 12–14.

Figure 14:
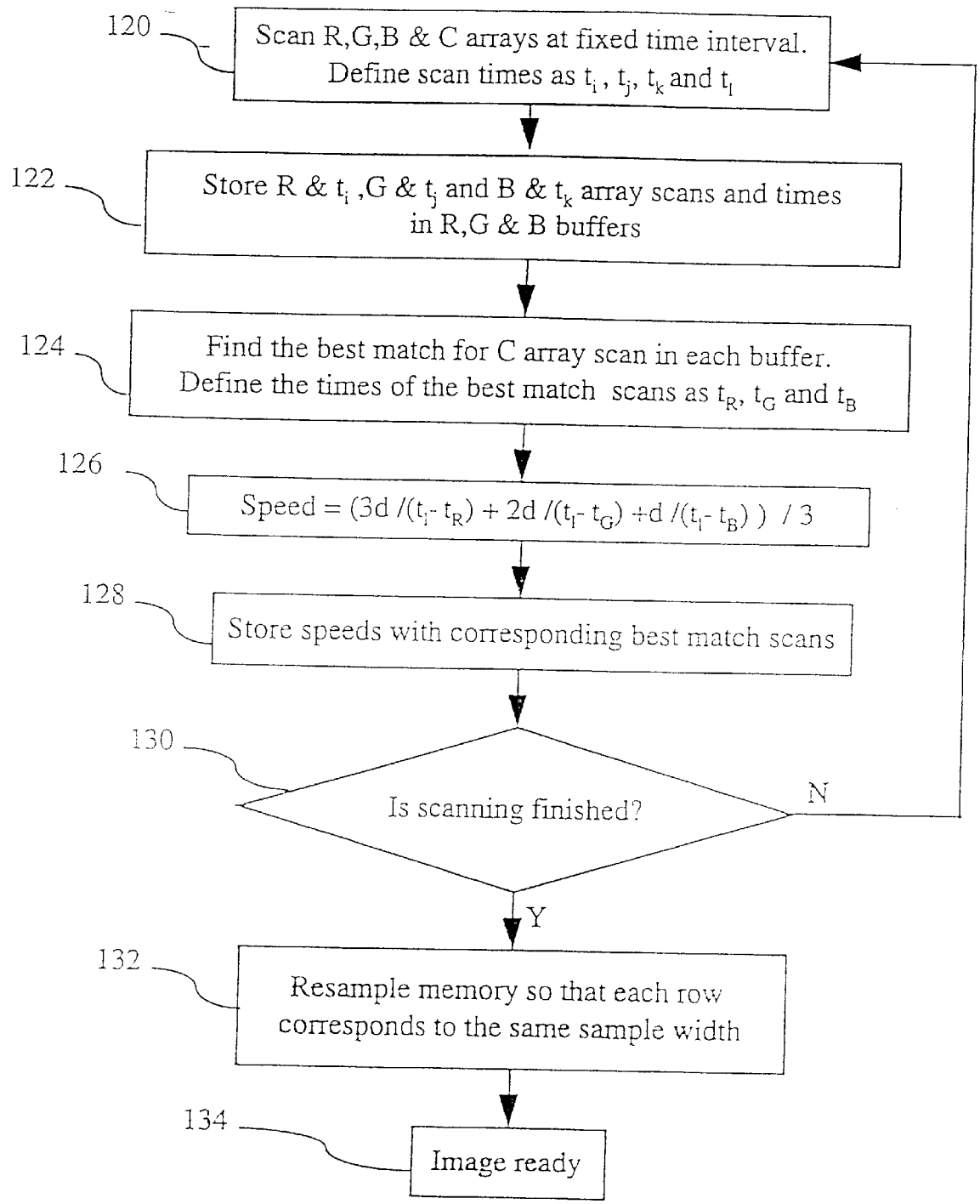
FIG. 14 is a flowchart illustrating the sequence of steps by which the FIG. 13 apparatus forms a colour image of a moving object.

The FIG. 14 flowchart depicts a method of operating the FIG. 13 colour imaging apparatus, using a fixed sampling rate. The FIG. 14 method is identical to the FIGS. 8 and 11 methods, except that whereas the FIGS. 8 and 11 methods are respectively adapted to the operation of dual and triple linear array sensors, the FIG. 14 method is adapted to operation of the FIG. 12 quadruple linear array colour sensor. Thus, at step 120, the signals produced by each of the R, G, B and C sensors at fixed time sampling intervals having times of occurrence $t_1, t_2, \ldots t_n$ are received as four 1×n pixel images of the four segments of object 12 seen by the four sensors at the respective sample times. For each time interval, the scanned R image signal produced by the R sensor is stored in an "R" buffer, the scanned G image signal produced by the G sensor is stored in a "G" buffer, and the scanned B image signal produced by the B sensor is stored in a "B" buffer. In each such case, a signal representative of the stored R, G or B image signal's time of occurrence is also stored in the respective R, G and B buffers, as indicated at step 122. At step 124, the previously scanned signals stored in the R, G and B buffers are compared with the scanned image signal produced by the C sensor to find the stored R signal most similar to (i.e. which best matches) the scanned C image signal, the stored G signal which best matches the scanned C image signal, and the stored B signal which best matches the scanned C image signal. Assuming the sensor arrays to be equally spaced, the speed S of object 12 is then determined, at step 126, as an appropriately weighted function of $3d/(t_1-t_R)$, $2d(t_1-t_G)$ and $d/(t_1-t_B)$, where $t_1$ is the time of occurrence of a selected one of the C image signals, and $t_R$, $t_G$ and $t_B$ are respectively the times of occurrence of the stored R, G and B signals which best match the selected C image signal. At step 128, the speed information is stored in the R, G and B buffers respectively, by appending the speed information to or otherwise associating it with the stored R, G and B signals which best match the scanned C image signal. As indicated by test step 130, the aforementioned steps are repeated, commencing with step 120, until the scanning process is finished. Once the scanning process is finished, the R, G and B components of the image are formed, at steps 132–134, by sequentially extracting image "strips" of equal width from the scanned image signals stored in the R, G and B buffers respectively. The R, G and B image components are then merged in well known fashion to yield the final, composite image.

As will be apparent to those skilled in the art in the light of the foregoing disclosure, many alterations and modifications are possible in the practice of this invention without departing from the spirit or scope thereof. For example, although operation of the FIGS. 10 and 12 sensors has been described with reference to a fixed sampling rate, those skilled in the art will appreciate that either sensor could alternatively be operated using real-time scan rate control, as described above with reference to FIG. 9 for the dual array sensor of FIG. 5. Those skilled in the art will also appreciate that non-optical sensors such as capacitive linear arrays may be used as the linear sensor arrays referred to herein.

As another example, although the colour imaging apparatus of FIGS. 12–13 has been described as having four sensors, those skilled in the art will understand that the "C" sensor may be eliminated if it can be assumed that the object being imaged is sufficiently multi-spectral in colour to facilitate adequate correlation between the R, G and B sensors without a base reference.

As a further example, one may substitute for any of the aforementioned 1×n pixel linear arrays an m×n pixel "area" array, where m≧2 (i.e. m rows, each having n pixels). Thus, instead of using three discrete 1×n pixel linear arrays as shown in FIG. 10, one could use, say, two or more discrete area arrays of 10×n pixels. As another alternative, one could employ a single area array of say, 500×n pixels, scan that array two or more times, and inspect rows having spacings corresponding to the spacings depicted in FIG. 10. Persons skilled in the art will readily appreciate that any desired combination of rows of such an area array could be scanned as hereinbefore described in the context of discrete linear arrays. The scope of the invention is to be construed in accordance with the substance defined by the following claims.

What is claimed is:

1. Imaging apparatus, comprising:

a. a first linear sensor array for producing, at a first time of occurrence, a first image of a segment of an object positioned adjacent said first sensor;

b. a buffer coupled to said first array, said buffer for accumulating said first image and said first time of occurrence for a successive plurality of segments of said object as said object moves across said first array;

c. a second linear sensor array extending substantially parallel to said first array and spaced from said first array by a distance d, said second array for producing, at a second time of occurrence, a second image of a segment of said object positioned adjacent said second sensor;

d. a comparator coupled between said buffer and said second array, said comparator for comparing said second image with each one of said accumulated images and for determining which one of said accumulated images is most similar to said second image; and, e. an object speed estimator for estimating said object's speed as a weight function S d/($t_i$−$t_m$), where $t_i$ is said time of occurrence of a selected one of said second images and $t_m$ is said time of occurrence of said first image most similar to said selected second image.

2. Imaging apparatus as defined in claim 1, further comprising sensor control means coupled between said object speed estimator and said first array, said sensor control means for controlling timing between successive ones of said first time of occurrence as a function of said speed S.

3. An imaging method comprising the steps of:

a. producing, at a first time of occurrence, a first image of a segment of an object positioned in a first location;

b. accumulating said first image and said first time of occurrence;

c. repeating said steps (a) and (b) for a successive plurality of segments of said object as said object moves across said first location;

d. producing, at a second time of occurrence, a second image of a segment of said object positioned in a second location extending substantially parallel to said first location and spaced a distance d from said first location;

e. comparing said second image with said accumulated first images and selecting that one of said accumulated first images which is most similar to said second image;

f. estimating said object's speed as a weight function S d/($t_i$−$t_m$), where $t_i$ is said time of occurrence of a selected one of said second images and $t_m$ is said time of occurrence of said first image most similar to said selected second image;

g. storing said speed estimate with said selected first image;

h. repeating said steps (a) through (g) until said object moves beyond said second location; and, i. combining said selected first images to produce a composite image of said object.

4. An imaging method as defined in claim 3, wherein:

a. said segment images are each produced during a time interval of fixed duration T; and, b. said combining step further comprises, for each one of said selected first segment images, resizing said selected first segment image from a width w=$S_i$ * T to a constant width, where $S_i$ is said speed estimate stored with said selected first segment image.

5. An imaging method comprising the steps of:

a. selecting a predefined time interval $T_{wait}$;

b. after expiry of said time interval $T_{wait}$, producing at a first time of occurrence, a first image of a first segment of an object positioned in a first location;

c. accumulating said first image and said first time of occurrence;

d. repeating said steps (b) and (c) for a successive plurality of said first segments as said object moves across said first location;

e. producing, at a second time of occurrence, a second image of a second segment of said object positioned in a second location extending substantially parallel to said first location and spaced a distance d from said first location;

f. comparing said second image with each one of said accumulated first images and selecting that one of said accumulated first images which is most similar to said second image;

g. estimating said object's speed as a weight function $S \: d/(t_i-t_m)$, where $t_i$ is said time of occurrence of a selected one of said second images and $t_m$ is said time of occurrence of said first image most similar to said selected second image;

h. determining said time interval $T_{wait}=1/(R * S)$ where R is a predefined image resolution;

i. repeating said steps (b) through (h) until said object moves beyond said second location; and, j. combining said selected first images to produce a composite image of said object.

* * * * *

UNITED STATES PATENT AND TRADEMARK OFFICE
CERTIFICATE OF CORRECTION

PATENT NO.         : 6,002,815
APPLICATION NO.    : 08/892577
DATED              : December 14, 1999
INVENTOR(S)        : Immega et al.

It is certified that error appears in the above-identified patent and that said Letters Patent is hereby corrected as shown below:

On the Title Page

(56) References Cited
U.S. Patent Documents

Insert --4,784,484  11/1998 Jensen
5,177,802  01/1993 Fujimoto et al.
5,195,145  03/1993 Backus et al.--

(56) References Cited
Other Documents

Insert --1997 "FingerChip" brochure of Thomson-CSF Semiconducteurs Specifiques--

(56) References Cited
Other Documents

Insert --undated Thomson-CSF Semiconducteurs Specifiques web page "FingerChip: the solution for fingerprint capture".--

(56) References Cited
U.S. Patent Documents

Insert --5,483,359  01/1996 Yumiba et al.
5,719,970  02/1998 Aoki et al.
5,777,755  07/1998 Aoki et al.--

(56) References Cited
Foreign Patent Documents

Insert --JP  08194774  07/1996
EP  073366A  09/1996--

(57) Abstract, line 15

Delete $S\ d/(t_j-t_m)$",
Insert -- $S \propto d/(t_j-t_m)$ --

In the Claims

Column 8, line 5, Claim 1

Delete "and,",
Insert --and--

Column 8, line 7, Claim 1

Delete "$S\ d/(t_i-t_m)$",
Insert --$S \propto d/(t_i-t_m)$--

Column 8, line 33, Claim 3

Delete "$S\ d/(t_i-t_m)$",
Insert --$S \propto d/(t_i-t_m)$--

Column 8, line 40, Claim 3

Delete "and,",
Insert --and--

UNITED STATES PATENT AND TRADEMARK OFFICE
CERTIFICATE OF CORRECTION

PATENT NO. : 6,002,815
APPLICATION NO. : 08/892577
DATED : December 14, 1999
INVENTOR(S) : Immega et al.

It is certified that error appears in the above-identified patent and that said Letters Patent is hereby corrected as shown below:

In the Claims (cont'd)

Column 9, line 6, Claim 5    Delete "S d/($t_i$-$t_m$)",
Insert --S $\propto$ d/($t_i$-$t_m$)--

Column 10, line 4, Claim 5    Delete "and,",
Insert --and--

Signed and Sealed this

Twenty-seventh Day of March, 2007

JON W. DUDAS
*Director of the United States Patent and Trademark Office*